United States Patent

Pollington et al.

[15] 3,655,969

[45] Apr. 11, 1972

[54] CUTTING TOOL

[72] Inventors: Bernard M. Pollington, 22600 Middlebelt, Farmington, Mich. 48204; Leslie W. Pollington, 19410 Renneseller, Livonia, Mich. 48152

[22] Filed: Aug. 7, 1970

[21] Appl. No.: 62,046

Related U.S. Application Data

[63] Continuation-in-part of Ser. No. 710,259, Mar. 4, 1968, Pat. No. 3,523,349.

[52] U.S. Cl. ....... 29/96
[51] Int. Cl. ....... B26d 1/00
[58] Field of Search ....... 29/96, 97, 98, 105, 105.1

[56] References Cited

UNITED STATES PATENTS

| | | | |
|---|---|---|---|
| 1,397,357 | 11/1921 | Bronander | 29/96 |
| 2,357,918 | 9/1944 | Trippler | 29/96 |
| 2,823,447 | 2/1958 | Doerseln | 29/96 |
| 2,922,219 | 1/1960 | Scott | 29/96 |
| 3,267,553 | 8/1968 | Mortenson | 29/96 |

FOREIGN PATENTS OR APPLICATIONS

| | | | |
|---|---|---|---|
| 106,253 | 5/1917 | Great Britain | 29/96 |

*Primary Examiner*—Harrison L. Hinson
*Attorney*—Hauke, Gifford and Patalidis

[57] ABSTRACT

A cutting tool for shapers, lathes and the like including a holder having a pair of gripping jaws formed at the intersection of two sides of the holder. The holder is provided with a slot disposed with respect to the gripping jaws such that widening of the slot causes the gripping jaws to be moved towards each other to securely clamp an elongated rectangular cutting tool insert therebetween, the insert having its cutting edge disposed on opposite ends thereof so that when one cutting edge becomes dull the insert can be reversed to present the other cutting edge. A screw engages the lower end of the insert to provide an adjustment for the insert and a second screw provides the means for widening the slot to lock the insert in position.

9 Claims, 4 Drawing Figures

PATENTED APR 11 1972
3,655,969
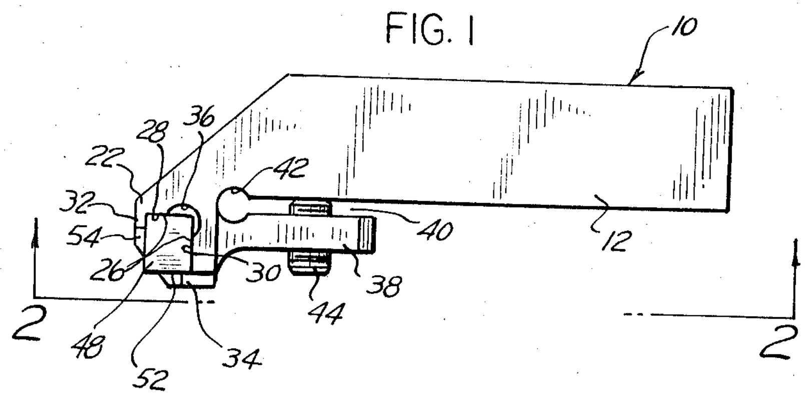
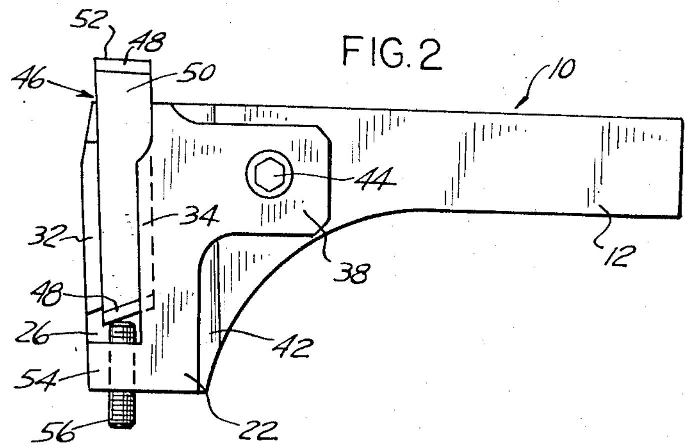
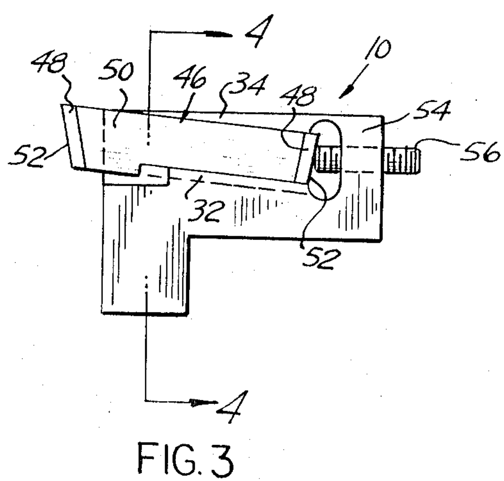
FIG. 3
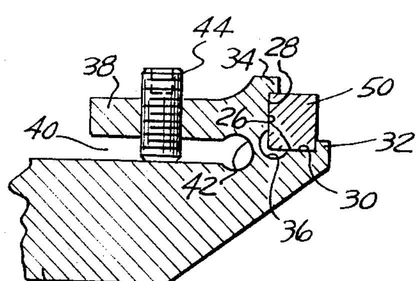
FIG. 4
INVENTORS
BERNARD M. POLLINGTON
LESLIE W. POLLINGTON
BY Hauke, Gifford & Patalidis
ATTORNEYS

CUTTING TOOL

RELATIONSHIP TO OTHER APPLICATIONS

The present application is a continuation-in-part of our copending application Ser. No. 710,259 filed Mar. 4, 1968, now U.S. Pat. No. 3,523,349 issued Aug. 11, 1970.

BACKGROUND OF THE INVENTION

1. Field of the Invention

The present invention relates to cutting tools and more particularly to such a tool including a holder, a cutting tool insert and means for securely attaching the insert to the holder.

2. Description of the Prior Art

Our aforementioned patent discloses and claims a cutting tool utilizing a holder having a pair of gripping jaws which are drawn together by widening a slot formed in the holder for this purpose. The cutting tool insert for these holders is provided with a cutting surface parallel to the gripping jaws and in order to securely grip the insert it has been necessary to form the insert to a very specific shape. This of course adds to the machining costs for such inserts. In addition, the particular shape of the insert and the manner in which it is mounted to the holder has limited the number of cutting edges which can be formed on the insert.

SUMMARY OF THE INVENTION

The present invention is an improvement of the tool holder described and claimed in our aforementioned patent. A holder is provided with an elongated channel formed in a corner and defined by a pair of oppositely disposed flanges which are adapted to embrace an elongated insert having rectangular sides. The insert is square in cross section and is formed with four cutting edges at each end of the insert.

A slot is provided in the handle such that widening the slot will cause the flanges to move together thus firmly gripping two opposite corner edges of the insert. A screw has an end abutting against a surface forming the slot such that tightening the screw will cause the slot to widen and the holder is formed of sufficiently resilient material so that loosening the screw causes the flanges to separate, permitting the insert to be removed. A screw adjustment means provides an adjustment for the longitudinal positioning of the insert within the channel.

The rectangular shape of the insert can be more readily and economically formed than the insert required for the holder of our aforementioned copending application. Also, four cutting edges can be formed at each end of the insert so that when one cutting edge becomes dull the insert can be moved to a new position to present a new cutting edge. This, of course, adds considerable life to the inserts.

DESCRIPTION OF THE DRAWINGS

Other advantages of the present invention will be readily apparent from the following description of the invention. The description makes reference to the accompanying drawings in which like reference characters refer to like parts throughout the several views and in which:

FIG. 1 is a top elevational view of a cutting tool of the present invention;

FIG. 2 is a side elevational view of the cutting tool illustrated in FIG. 1 and as seen substantially from the bottom thereof;

FIG. 3 is an end elevational view of the present invention as seen substantially from the left side of FIG. 2; and FIG. 4 is a transverse cross sectional view of the present invention taken substantially along line 4—4 of FIG. 3.

DESCRIPTION OF A PREFERRED EMBODIMENT

Now referring to the drawing for a more detailed description of the present invention, a cutting tool is illustrated as including a holder 10 having a shank portion 12 which provides the means for mounting the holder 10 to a machine (not shown). The holder 10 is generally L-shaped when viewed in side elevation as can best be seen in FIG. 2 and includes an elongated front portion 22 substantially perpendicular to, but offset from, the shank portion 12 as can best be seen in FIG. 1. As can best be seen in FIG. 2, although the front portion 22 is substantially perpendicular to the shank 12, it is preferably formed such that its axis extends at a small angle to the vertical so that the upper portion is slightly forward of or to the left as viewed in the drawings of the lower portion.

The front portion 22 is generally rectangular in cross section and has a substantially rectangular channel 26 formed in the outermost corner edge thereof. As can best be seen in FIGS. 1 and 4, the channel 26 is defined by substantially planar inner walls 28 and 30 formed at a right angle and flanges 32 and 34 which extend at substantially right angles from the free edge of the walls 28 and 30 respectively. A bore 36 is formed at the intersection of the walls 28 and 30.

An arm portion 38 extends from the front portion 22 and is separated from the shank 12 by a slot 40. A bore 42 intersects the inner edge of the slot 40 to aid in the flexibility of arm portion 38. A screw 44 is threaded through the arm portion 38 to engage the surface of the shank 12 defining the slot 40 so that tightening the screw 44 urges the arm portion 38 away from the shank 12 to widen the slot 40.

A cutting tool insert 46 is provided having generally trapezoidal sides as can best be seen in FIGS. 2 and 3, but which as can best be seen in FIG. 4 is substantially square in cross section. The insert 46 is formed with cutting member 48 at each end and bonded or otherwise attached to an intermediate section 50. The cutting members 48 are formed of carbide or similar material as is conventional in the cutting tool art and the use of the intermediate section 50 permits a less expensive material to be used between the cutting members 48. The insert 46 provides four cutting edges 52 at each end and the trapezoidal construction of the insert in combination with the slight forward tipping of the front portion 22 brings the front cutting edge 52 to a slightly raised and inclined position as can best be seen in FIG. 2.

As can best be seen in FIGS. 2 and 3, the channel 26 does not extend all of the way through the bottom of the front portion 22 so that an end section 54 remains closing the lower end of the channel 26. A screw 56 is threadably received by the end section 54 and extends upwardly into the channel 26.

The insert 46 is received in the channel 26 and is mounted in position by sliding it down axially from the top of the channel 26 between the flange portions 32 and 34. The screw 56 provides a stop for the lower end of the insert 46 so that adjusting the screw 56 into and out of the channel 26 provides a height adjustment for the cutting edge 52.

Once the insert 46 has been positioned within the channel 26 at the proper height adjustment, the screw 44 is tightened to widen the slot 40 by moving the arm 38 away from the shank 12. The section of the front portion 22 which defines the wall 30 and the flange portion 34 is integrally joined to the arm portion 38 and movement of the arm portion 38 away from the shank 12 causes this section of the front portion 22 to be moved toward the wall 26 and the flange portion 32 to firmly grip the cutting tool insert 46 therebetween. The bore 36 aids in this flexing of a section of the front portion 22. The holder 10 is preferably constructed of a suitable resilient material so that upon loosening of the screw 44 the holder 10 will resume its original form and the insert 46 will be easily removed from the channel 26.

It is apparent that the present construction is an improvement over the holder of our aforementioned copending application. The elongated channel 26 provides a much more secure retention of the insert 22 and permits the insert to be constructed in a configuration which is easier and more economical to form. In addition, the insert 46 can be rotated and reversed until all of the cutting edges 52 have been used so it is capable of much longer life than the inserts of our aforementioned holder.

It is also apparent that although we have described several embodiments of our invention many changes and modifications can be made therein without departing from the spirit of the invention.

We claim:

1. A cutting tool comprising:

a holder provided with an elongated slotted corner portion forming resilient gripping jaws;

said holder formed with an elongated slot disposed so that widening of the slot urges said gripping jaws one toward the other;

an elongated cutting tool insert carried by said gripping jaws, said insert having a cutting surface disposed on one end and perpendicular to the longitudinal axis of said insert; and means carried by said holder and selectively operable to widen said slot to thereby retain said insert in said holder.

2. The invention according to claim 1 wherein said last mentioned means comprises a screw operable upon tightening to widen said slot.

3. The invention according to claim 1 wherein said slot is disposed substantially parallel to the longitudinal axis of said channel.

4. The invention according to claim 1 wherein two bores are formed in said holder, the first bore being formed substantially parallel to said channel and including at least a portion of a corner of said channel, the second bore being formed at one end of said slot and being substantially parallel to the first bore, the combination of said bores forming a reduced portion of said holder substantially parallel to said channel.

5. A cutting tool comprising:

a holder provided with an elongated slotted corner portion forming resilient gripping jaws;

said holder formed with an elongated slot disposed so that widening of the slot urges said gripping jaws one toward the other;

an elongated cutting tool insert carried by said gripping jaws;

first means carried by said holder and selectively operable to widen said slot to thereby retain said cutting tool in said holder; and second means to adjust the longitudinal positioning of said insert in said gripping jaws.

6. The invention according to claim 5 wherein said second means comprises a screw, the axis of said screw substantially parallel to the axis of said cutting tool and one end of said screw abutting against one end of said insert.

7. The invention according to claim 5 wherein said first means comprises a screw operable upon tightening to widen said slot.

8. The invention according to claim 5 wherein said slot is disposed substantially parallel to the longitudinal axis of said channel.

9. The invention according to claim 5 wherein two bores are formed in said holder, the first bore being formed substantially parallel to said channel and including at least a portion of a corner of said channel, the second bore being formed at one end of said slot and being substantially parallel to the first bore, the combination of said bores forming a reduced portion of said holder substantially parallel to said channel.

* * * * *